United States Patent [19]

Satomi

[11] Patent Number: 4,913,359
[45] Date of Patent: Apr. 3, 1990

[54] PAPER MATERIAL REFINING APPARATUS

[75] Inventor: Hitoshi Satomi, Shizuoka, Japan

[73] Assignee: Kabushiki Kaisha Satomi Seisakusho, Shizuoka, Japan

[21] Appl. No.: 325,644

[22] Filed: Mar. 20, 1989

[30] Foreign Application Priority Data

Mar. 31, 1988 [JP] Japan .................................. 63-79760

[51] Int. Cl.$^4$ .............................................. B02C 23/24
[52] U.S. Cl. ......................:...................... 241/57; 241/51; 241/62
[58] Field of Search ................ 241/46 R, 46 B, 46.02, 241/46.11, 51, 57, 62

[56] References Cited

U.S. PATENT DOCUMENTS 4,135,671 1/1979 Kohrs ........................... 241/46.11 X
4,553,704 11/1985 Wilson et al. ......................... 241/39

FOREIGN PATENT DOCUMENTS 175766 9/1965 U.S.S.R. ............................ 241/46.11

Primary Examiner—Timothy V. Eley
Attorney, Agent, or Firm—Ladas & Parry

[57] ABSTRACT

An apparatus for refining a starting material for paper containing heavy and light foreign substances and an ink material generally comprises a primary chamber having one end opened as a port, a secondary chamber connected coaxially with a contiguously to the other end of the primary chamber on the downstream side thereof, a screen plate interposed between and separating the primary and secondary chambers, the screen plate being provided with through holes such as fine slits, and an impeller disposed in the primary chamber at the central portion thereof near the screen plate and provided with pump-up vanes to be rotated by a driving device to create a swirling motion in the primary chamber. The apparatus further comprises a pipe inserted centrally into said primary chamber through the port formed at the one end portion thereof for feeding the starting paper material to be treated in the primary chamber and a pipe inserted into and coaxially with the starting material feeding pipe for supplying air thereinto to be mixed with the starting material. The primary chamber and the secondary chamber may be of vertical or horizontal orientation.

11 Claims, 4 Drawing Sheets

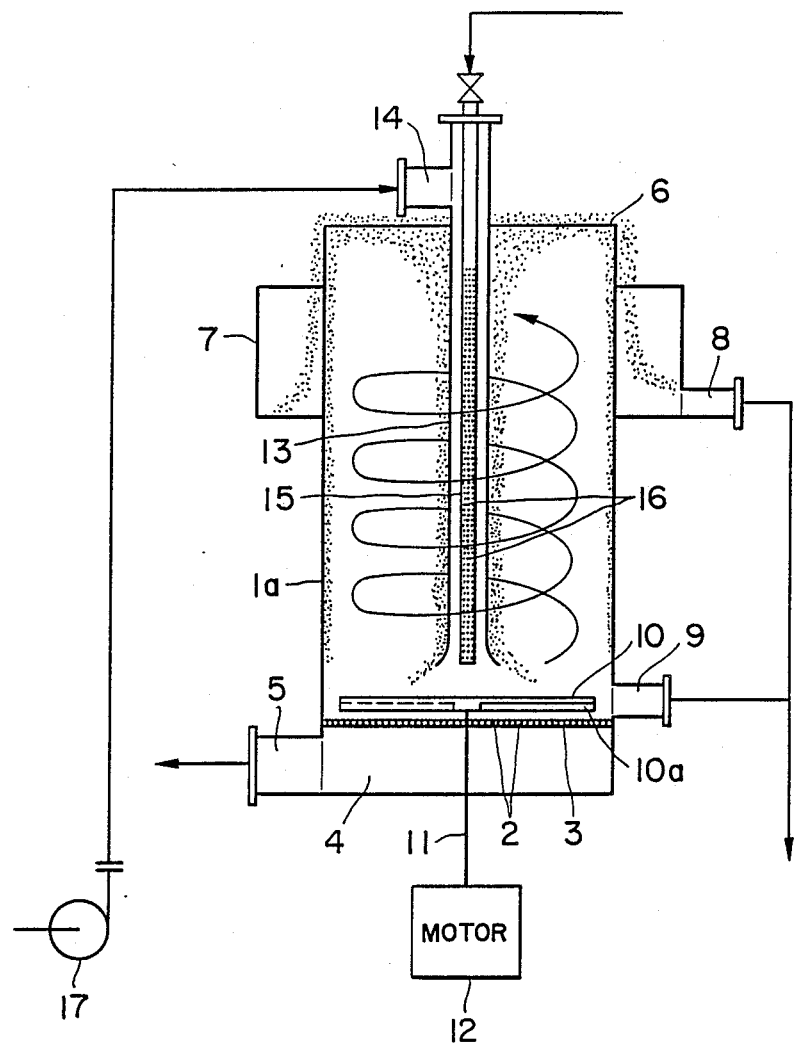
F I G. 4

PAPER MATERIAL REFINING APPARATUS

BACKGROUND OF THE INVENTION

This invention relates to an apparatus for refining paper materials which is particularly adapted to remove heavy and light foreign substances and printing ink which are admixed with a starting material to be treated and thereafter to refine only the paper material through screen means.

The Japanese Patent Publication No. 59-34838 of the same applicant discloses a paper material refining apparatus which operates to remove heavy and light foreign substances from the starting material to be treated and, thereafter, to refine the paper material by removing the foreign substances through a screen plate. The refining apparatus is provided with a primary and secondary chambers of thin type separated by the interposed screen plate and an impeller disposed in the primary chamber near the screen plate. A port for feeding the paper material is disposed in the front wall of the primary chamber at a position corresponding to the central portion of the impeller. A light foreign substance collector is installed within the feeding port in coaxial alignment therewith, and the collector is connected to a separator through piping. A discharging port for the heavy foreign substance is provided at the outer periphery of the primary chamber in a tangential state thereto, and the discharging port is also connected to the separator through piping.

According to the refining apparatus disclosed in the Japanese Patent Publication referred to hereinabove, the heavy foreign substances admixed in the starting material to be treated are moved from the central portion of the primary chamber toward the outer periphery thereof along the front wall by the action of the centrifugal force due to the swirling motion of the impeller, collected there, and then discharged outwardly through the discharging port. The light foreign substance is collected, because the center of the swirling flow is pressure-reduced, at this pressure reduced portion, i.e., at a portion in front of the collector in the form of a bell, flows inside the collector while swirling, and then is outwardly discharged. Accordingly, only the paper material, with the heavy and light substances removed remains near the location of the impeller in the primary chamber, and the paper material can be effectively refined through the screen plate without clogging thereof by the pressure difference between the primary chamber and the secondary chamber caused by the rotation of the impeller.

However, the refining apparatus of the described prior type is not provided with any means for removing printing ink material, simply called ink hereinafter, so that when a waste paper material printed with the ink is used as a starting material to be refined, the paper material refined and discharged may include the ink. Thus this prior refining apparatus requires additional means for removing the ink after the refining process and the provision of such additional means involves much cost and time.

SUMMARY OF THE INVENTION

An object of this invention is to substantially eliminate the problem or drawback encountered in the conventional technique described above and to provide an improved apparatus for refining a starting paper material to separate and remove the heavy and light foreign substances as well as an ink material contained in the starting paper material by the centrifugal force due to an impeller disposed in the refining apparatus.

Another object of this invention is to provide an improved paper refining apparatus including no additional means for specifically removing an ink material after once removing the heavy and light foreign substances from the starting paper material to be treated.

A further object of this invention is to provide an improved paper refining apparatus capable of obtaining finely refined paper material with reduced cost and time.

These and other objects can be achieved according to this invention by providing an apparatus for refining a starting paper material containing heavy and light foreign substances and an ink material generally comprising a primary chamber having one end opened as a port, a secondary chamber disposed at the other end of thhe primary chamber on the downstream side thereof, a screen plate interposed between and separating the primary and secondary chambers, the screen plate being provided with through holes such as fine slits, and an impeller disposed in the primary chamber at the central portion thereof near the screen plate and provided with a pump-up vanes to be rotated by a driving device. The apparatus further comprises a pipe inserted into said primary chamber through the port formed at one end portion thereof for feeding the starting paper material to be treated in the primary chamber and a pipe inserted into and coaxially with the starting material feeding pipe for supplying air thereinto to be mixed with the starting material.

In preferred embodiments, the primary and secondary chambers are arranged with vertical or horizontal orientation, and the inserted front end of the starting material feeding pipe has a flared bell-shaped opening near the central portion of the impeller. The air supplying pipe also has an inserted front end at substantially the same level as that of the bell shaped end of the starting material feeding pipe, the air supplying pipe being provided with a number of fine holes through which air is spread and diffused into the starting material during its passage through the feeding pipe.

According to the construction of the preferred embodiment of this invention, the starting material is fed through the starting material feeding pipe into the primary chamber of the paper refining apparatus towards the central portion of the impeller which is rotating at high speed, while air is supplied into the starting material through the air spplying pipe disposed concentrically within the starting material feeding pipe. At this time, the air is formed into air bubbles which collide with the central portion of the rotating impeller together with the starting material thereby to be finely atomized and uniformly diffused into the starting material due to the vigorous agitation of the impeller. The thus mixed starting material is swirled at high speed in the primary chamber. The foreign substances contained in the starting material are also swirled by the centrifugal force caused by the rotation of the impeller and these substances are separated into heavy and light substances, that is, the heavy substances are gathered near the peripheral surface of the primary chamber and moved upwardly along the wall thereof, and the light substances and air bubbles are gathered toward the central portion of the primary chamber. In addition, other substances such as ink which have densities slightly different from that of the paper material are caught or intercepted by the air bubbles. The air bubbles and the ink are moved upwardly along the outer periphery of the starting material feeding pipe at the central portion of the primary chamber. The heavy and light foreign substances and the ink are thus moved upwardly and then overflow through the overflow port disposed at the upper end portion of the primary chamber. Accordingly, in the primary chamber, only the paper material having a density ranging between those of the heavy and light substances remain. The rest of the paper material is fed into the secondary chamber through the slots of the screen plate due to the cavitation caused by the vigorous rotation of the impeller. The high speed rotation of the impeller prevents the slots of the screen plate from being clogged. The thus fed paper material is then discharged and transferred to a device for the next treatment.

The heavy and light foreign substances received by the receptable disposed near the overflow port are fed toward a recovery device through a conduit, and the paper material adhering to and removed with these substances is recovered by the recovery device. The recovered paper material is again fed into the primary chamber together with the starting paper material to be subsequently treated. The paper material can thus be utilized with minimum loss.

As described above, according to this invention, not only the heavy and light foreign substances but also the ink both contained in the starting material to be treated, can be effectively removed without utilizing any means such as floatater for specifically removing the ink material, whereby additional equipment can be reduced, which results in a reduction of the operational cost and time as well as space for installing the refining apparatus. The treating efficiency can also be improved remarkably in comparison with the usage of the conventional refining apparatus.

The preferred embodiments of this invention will now be described further in detail hereunder with reference to the accompanying drawings.

BRIEF DESCRIPTION OF THE DRAWINGS

In the accompanying drawings:

FIGS. 4 and 5 are side elevations, with parts in vertical section, of second and third embodiments of this invention.

DESCRIPTION OF THE PREFERRED EMBODIMENTS

Figure 1:
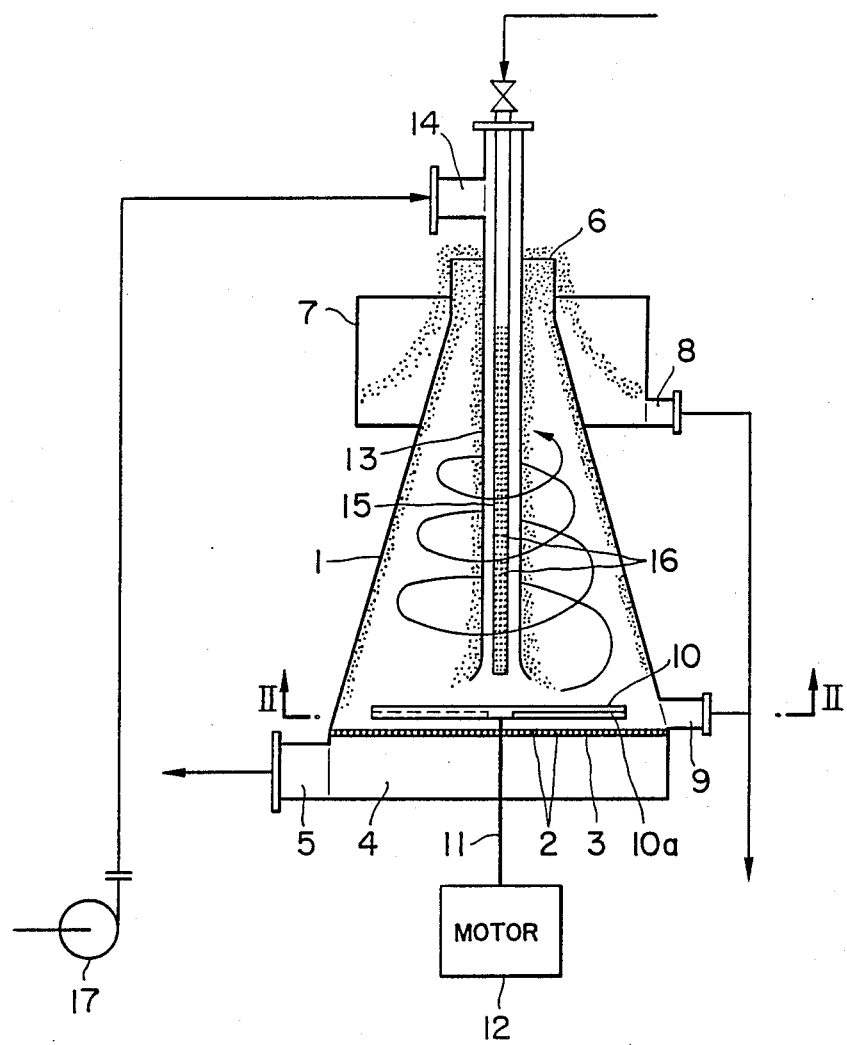
FIG. 1 is a side elevation, with parts in vertical section, of a first embodiment of this invention.

FIG. 1 shows a first embodiment of the paper material refining apparatus according to this invention, which is provided with a primary chamber of vertical type of conical shape. The primary chamber 1 of this example has a frustoconical vertical section with a wider lower portion and a narrower upper portion so as to prevent the lowering of the swirling speed even when heavy foreign substances are moved upwardly by the swirling motion described hereinafter. This primary chamber 1 has a circular or polygonal, substantially circular, cross section for smooth swirling of the paper material and foreign substances in the primary chamber.

This refining apparatus is also provided with a secondary chamber 4 formed coaxially and contiguously below the wider portion of the primary chamber 1 and separated therefrom by a screen plate 3 provided with fine perforations or slits 2. The secondary chamber 4 is provided with a port 5 for discharging the refined paper material to the next station for subsequent treatment.

An upper opening of the primary chamber on the narrower side is formed as an overflow port 6 through which the foreign substances moved upwardly in the primary chamber 1 overflow into a receptacle 7 located outside the overflow port 6. The receptacle 7 is provided with a port 8 for transferring the received foreign substances to a paper material recovering device, not shown. A discharge port 9 is further located at the bottom side part of the primary chamber 1 for taking out a large foreign substance from the primary chamber 1 and is normally closed during the operation.

Figure 2:
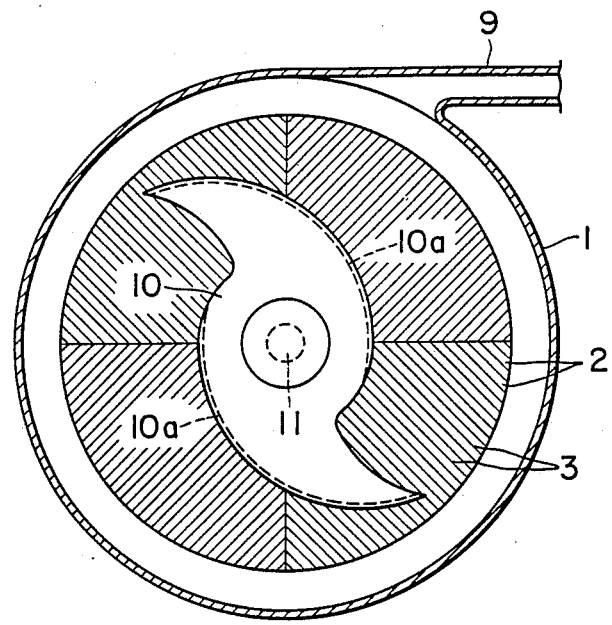
FIG. 2 shows a cross section taken along the line II—II shown in FIG. 1 as viewed in the arrow direction.
Figure 3:
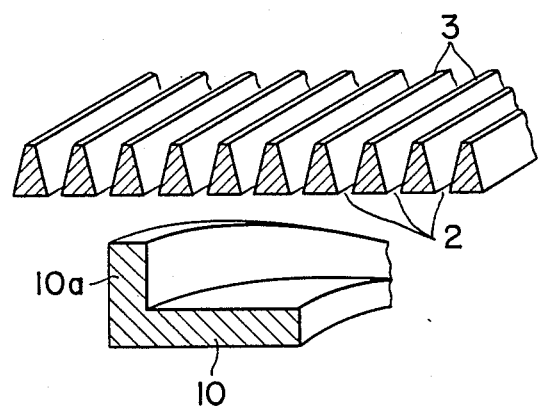
FIG. 3 is a perspective view of portions of an impeller and a screen plate of the apparatus according to this invention.

An impeller 10 is disposed centrally in the primary chamber 1 immediately above the screen plate 3 and is driven by a driving means such as an external electric motor 12 through a vertical driving shaft 11 extending coaxially through the secondary chamber 4. This impeller 10 has a structure such that a cavitation is caused near the screen plate 3 by pump-up vanes 10a of the type shown in FIGS. 2 and 3 when the impeller 10 is rotated at high speed. The impeller 10 operates to vigorously agitate the starting material and air bubbles fed into the central portion of the primary chamber 1 so as to finely pulverize the air bubbles and uniformly mix them with the starting material and also operates to impart a swirling motion to the paper material and the foreign substances in the primary chamber 1.

A starting material feeding pipe 13 is inserted downwardly and coaxially into the primary chamber 1 through the overflow port 6, and the inserted front or lower end thereof is positioned near the central portion of the impeller 10 and is formed into a bell shape. A starting material feeding port 14 is formed on the upper part of the feeding pipe 13. Through this port 14 the starting material is fed into the pipe 13 from a feeding source 17. An air supply pipe 15 is coaxially inserted into the starting material feeding pipe 13. The air supply pipe 15 may have a length somewhat shorter than the length of the pipe 13 to forcibly feed the air into the primary chamber 1 by an air feeding device, for example, or may have a length substantially equal to that of the pipe 13. In the latter case, the front end of the air supply pipe 15 is positioned near the central portion of the impeller 10 to cause air to be taken in by utilizing suction caused by the rotation of the impeller 10. A number of fine air diffusing holes 16 are formed in the peripheral surface of the air supply pipe 15 to improve the air diffusing effect. The air is blown into the starting material passing the starting material feeding pipe 13 through the air diffusing holes 16. The thus mixed material and air are caused to collide with the central portion of the impeller 10 to further break up the air bubbles and uniformly diffuse the same into the starting material.

In an actual refining experiment with the use of the refining apparatus according to the first embodiment of the invention in which the primary chamber 1 and the secondary chamber 4 were separated by the screen plate 3 provided with the slits each having a width of 0.15 mm. The impeller 10 was rotated at a tip speed of 30 m/min., and the starting material was fed through the feeding pipe 13 under a pressure of 2 kg/cm$^2$. Air was fed through the holes 16, each having a diameter of 1.5 mm of the air supply pipe 15, under a pressure of 3 kg/cm$^2$. As a result, the refined paper material included substantially no heavy and light foreign matter as well as the ink, and another additional treatment for removing the ink was not necessary. The treating density or efficiency may be of the order of 1.5 to 2.0 due to the synergetic effect of the separation due to the centrifugal force and the floatation. Accordingly, the treatment can be done with an efficiency of 1.5 to 2 times in comparison with the treatment by the use of a conventional floatater, for example, which has a treating efficiency of less than the order of 1.0, for instance. Moreover, the density of the discharged foreign substance is made high, so that the rate of the amount of the starting material with respect to the amount of the discharged foreign substance, i.e, tale rate, becomes 3 to 4%, the rate based on the conventional refining apparatus being 10 to 15%, whereby the rate can be reduced to less than ⅓ according to the refining apparatus of this invention.

FIG. 4 shows a second embodiment of the paper material refining apparatus according to this invention, which is provided with a vertically cylindrical primary chamber 1a. The primary chamber 1a thus has upper and lower cylindrical portions of substantially the same diameter. According to this embodiment, when heavy foreign substances are floated upwardly by the swirling force, the swirling speed of the substances is gradually reduced. This tendency is inferior in separation capability, so that this apparatus is suitable for the treatment of starting material containing a small amount of heavy foreign substances. The other constructional elements or members and the operations thereof are substantially the same as those described hereinbefore with reference to the first embodiment of the invention. Accordingly, detailed description of such parts will not be repeated. Such parts are designated by like reference numerals of the corresponding members in the embodiment shown in FIG. 1.

Figure 5:
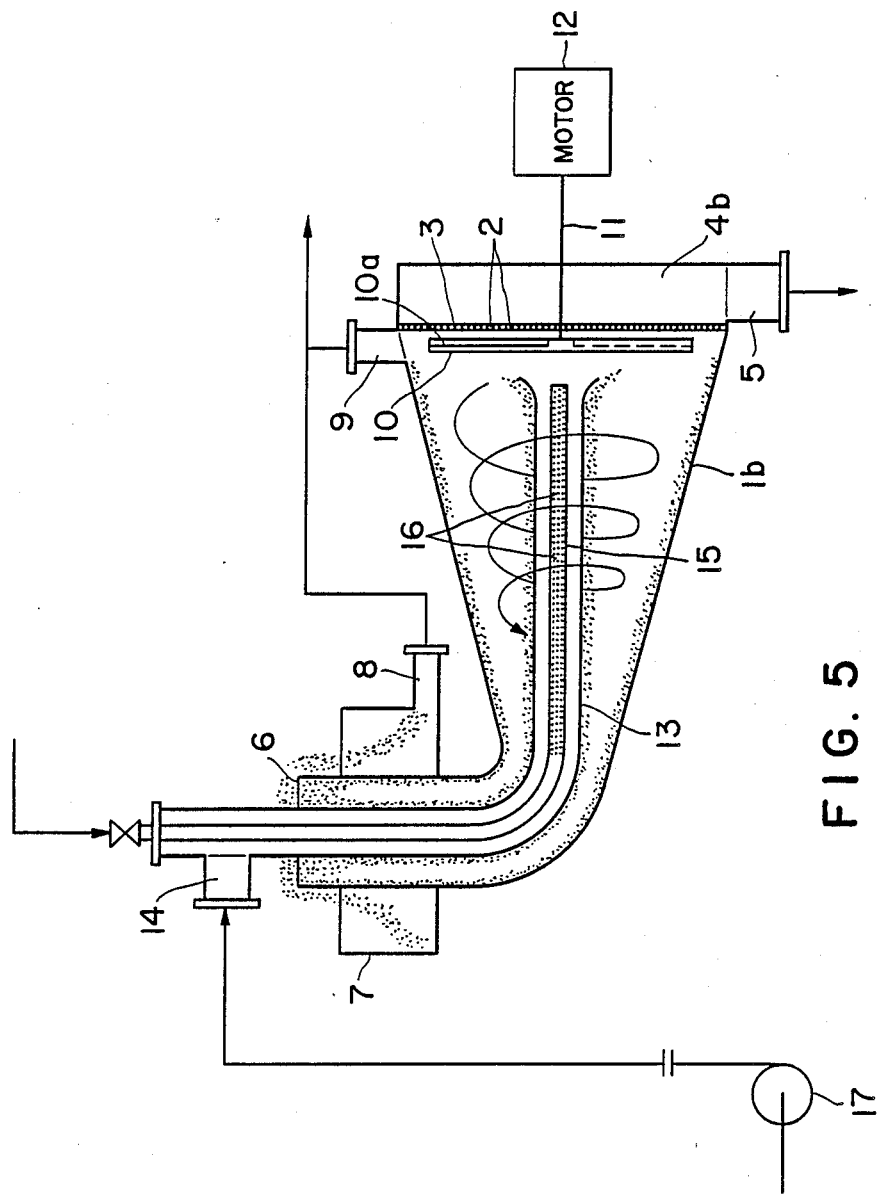

FIG. 5 shows a third embodiment of the paper material refining apparatuus according to this invention which is of a horizontal cone-shaped type. According to this embodiment, the central axes of the primary chamber 1b and the secondary chamber 4b are horizontal or slightly inclined with respect to the horizontal plane. The upper end of the primary chamber 1b constituting the overflow port 6 is bent upwardly so as to effectively receive the overflow foreign substances as described with reference to the first embodiment. The other elements or parts constituting the refining apparatus of this embodiment and the operations thereof are substantially the same as those described hereinbefore with reference to the first embodiment shown in FIG. 1. Accordingly, details thereof will not be described again. Like parts in FIG. 1 and FIG. 5 are designated by like reference numerals.

What is claimed is:

1. An apparatus for refining a starting paper material containing admixed foreign substances and ink material, said apparatus comprising:

a primary chamber means having one end opened as a port means;

a secondary chamber means disposed coaxially with and contiguously to said primary chamber means at the other end thereof on a downstream side;

a screen means interposed between and separating said primary chamber means and secondary chamber means, said screen means being provided with hole means through which a paper material passes from said primary chamber means towards said secondary chamber means;

an impeller disposed in said primary chamber means at the central portion thereof near said screen means and provided with pump-up vanes to be rotated by a driving means;

a pipe means inserted and extending into said primary chamber means through said port means for feeding said starting paper material into the primary chamber; and a pipe means inserted into and coaxially with said starting material feeding pipe means for supplying air into said starting paper material.

2. A refining apparatus according to claim 1, wherein said primary chamber means and said secondary chamber means are vertically arranged and have substantially circular cross sections.

3. A refining apparatus according to claim 2, wherein said primary chamber means has a frustoconical vertical section in which the diameter of the upper portion of the primary chamber means is made smaller than that of the lower portion of the same.

4. A refining apparatus according to claim 2, wherein said primary chamber means has a rectangular vertical section.

5. A refining apparatus according to claim 1, wherein said primary chamber means and said secondary chamber means are horizontarily arranged in which one end provided with said port means of said primary chamber means is bent upwardly.

6. A refining apparatus according to claim 1, wherein said starting material feeding pipe has an inserted front end opening of bell shape near the central portion of said impeller, and said air supplying pipe means has an inserted front end at substantially the same level as that of said bell shaped end of said starting material feeding pipe means.

7. A refining apparatus according to claim 1, wherein said air supplying pipe means is provided through a peripheral wall surface thereof with a number of fine holes through which air is blown and diffused into the starting paper material passing said starting material feeding pipe means.

8. A refining apparatus according to claim 1, wherein said hole means of said screen means are fine slits.

9. A refining apparatus according to claim 1, wherein said hole means of said screen means are fine perforations.

10. A refining apparatus according to claim 1, wherein said secondary chamber means is provided with a port for discharging the refined material for a subsequent treatment.

11. A refining apparatus according to claim 1, wherein a receptacle means is further disposed near said port means for receiving substances which have overflowed from said primary chamber means through said port means.

* * * * *